Feb. 19, 1924.

M. H. DUNBAR

BATTERY CONNECTION

Filed July 1, 1921

1,484,431

Inventor

Milo H. Dunbar
By Fresse and Bond
Attorneys

Patented Feb. 19, 1924.

1,484,481

UNITED STATES PATENT OFFICE.

MILO H. DUNBAR, OF CANTON, OHIO.

BATTERY CONNECTION.

Application filed July 1, 1921. Serial No. 461,741.

*To all whom it may concern:*

Be it known that I, MILO H. DUNBAR, a citizen of the United States, residing at Canton, in the county of Stark and State of Ohio, have invented a new and useful Battery Connection, of which the following is a specification.

This invention relates to battery connections for batteries such as are used in automobiles, and has for its objects the provision of a connection between the electric conductors upon the automobile and the terminals of the battery, being designed to be easily and quickly applied to the conductor terminals of any usual construction of automobile.

With these objects in view, the invention consists in the construction and arrangement of parts hereinafter described and illustrated in the accompanying drawings, it being understood that various changes in the form and details of construction may be made within the scope of the appended claims.

The invention thus set forth in general terms is illustrated in the accompanying drawings, in which—

Figure 2:
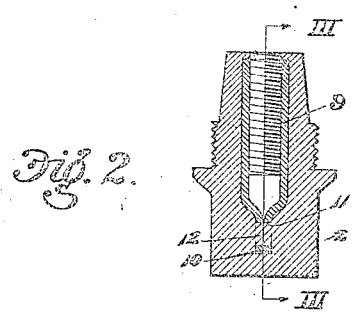
Figure 4:
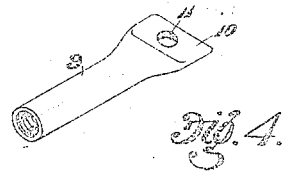
Figures 1, 3, 5:
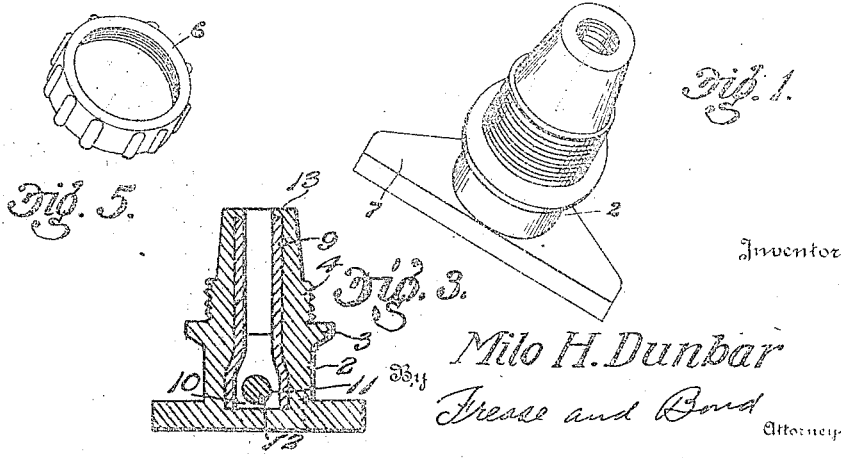

Figure 1 is a perspective view of the improved terminal forming a part of the connection embodying the invention;

Fig. 2, a vertical, sectional view through the same;

Fig. 3, a section on the line 3—3, Fig. 2;

Fig. 4, a perspective view of the interior threaded brass tube which is located within the battery terminal;

Fig. 5, a detail perspective view of the nut provided for holding the battery terminal in place through the cover of the battery.

Similar numerals of reference refer to corresponding parts throughout the drawings.

A portion of the cover of the usual battery cell is shown at 1 and the improved battery terminal post which is located through said cover and connected thereto, is indicated generally by the numeral 2 and is provided with the annular shoulder 3 which engages the under side of the cover 1, the threaded portion 4 of the post being located through the aperture 5 in the cover, a nut 6 being mounted upon said threaded portion of the post and arranged to be engaged with the upper surface of the cover to clamp the battery terminal post firmly to the cover.

The horizontally disposed plate portion 7 is formed upon the lower end of the post, the usual battery plates being burnt or welded thereto. The tapered upper portion 8 of the post extends above the threaded portion 4 and is of suitable height to permit the attachment of any of the usual conductor terminals thereto as will be later described.

As is usual in batteries of this character, this battery terminal post is cast from lead. The internally threaded brass tube 9, which is flattened at its lower end, as shown at 10 and provided with an aperture 11 through said flattened end to allow the lead to pass therethrough as shown at 12, to more securely bind the tube within the post, is located through the longitudinal center of the post.

This tube is first coated or plated with tin and is placed within the die or mold within which the battery terminal post is cast, the tube thus becoming an integral part of the post. It will be noted that the tube terminates at a point spaced from the battery end of the post, the lead extending over the upper end of the tube as at 13, thus protecting the upper end of the brass tube from the acids contained in the battery, the tin plating upon the interior of the tube preventing the acid from damaging the threads.

I claim:—

1. In a battery terminal connection, a lead battery terminal post and a tin coated, internally threaded tube mounted within said post.

2. In a battery terminal connection, a lead battery terminal post and an internally threaded tube around which the post is molded, said tube having a flattened lower end to prevent removal of the same from the post.

3. In a battery terminal connection, a lead battery terminal post and an internally threaded tube around which the post is molded, said tube having a flattened lower end having a transverse opening to prevent removal of the same from the post.

In testimony that I claim the above, I have hereunto subscribed my name.

MILO H. DUNBAR.